United States Patent
Nakahara

(10) Patent No.: US 11,163,509 B2
(45) Date of Patent: Nov. 2, 2021

(54) IMAGE PROCESSING APPARATUS AND NON-TRANSITORY COMPUTER READABLE MEDIUM STORING IMAGE PROCESSING PROGRAM

(71) Applicant: FUJIFILM Business Innovation Corp., Tokyo (JP)

(72) Inventor: Toshiaki Nakahara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 251 days.

(21) Appl. No.: 16/208,579

(22) Filed: Dec. 4, 2018

(65) Prior Publication Data

US 2019/0278543 A1    Sep. 12, 2019

(30) Foreign Application Priority Data

Mar. 7, 2018 (JP) .............................. JP2018-041265

(51) Int. Cl.
*G06F 3/12* (2006.01)
*G06K 15/02* (2006.01)

(52) U.S. Cl.
CPC .......... *G06F 3/1257* (2013.01); *G06F 3/1204* (2013.01); *G06F 3/1273* (2013.01); *G06F 3/1285* (2013.01); *G06K 15/1807* (2013.01)

(58) Field of Classification Search
CPC .... G06F 3/1257; G06F 3/1273; G06F 3/1285; G06F 3/1204; G06F 3/1262; G06F 3/1211; G06K 15/1807
See application file for complete search history.

(56) References Cited

U.S. PATENT DOCUMENTS

| 7,991,317 B2* | 8/2011 | Kato .................. G03G 15/5016 399/81 |
| 2017/0070624 A1* | 3/2017 | Hanada .............. H04N 1/00506 |
| 2017/0185356 A1* | 6/2017 | Kawaguchi ........ H04N 1/00949 |
| 2019/0272133 A1* | 9/2019 | Liebelt .................. G06F 3/1205 |

FOREIGN PATENT DOCUMENTS

JP     2008210383     9/2008

* cited by examiner

*Primary Examiner* — Neil R McLean
(74) *Attorney, Agent, or Firm* — JCIPRNET

(57) ABSTRACT

An image processing apparatus includes processing request template generation unit that generates a processing request flow in which plural processing requests are associated with each other, as one processing request template, in a case where there is a commonality among plural pieces of image data relating to plural processing requests each of which request type is identified, and a template display control unit that displays the processing request template on a display unit.

9 Claims, 3 Drawing Sheets

| USER ID | JOB TYPE | | | | JOB FLOW | NUMBER OF EXECUTIONS | JOB TEMPLATE GENERATION ORDER |
|---|---|---|---|---|---|---|---|
| A | BoxIn | Print | MailSend | HttpSend | A1 | 32 | A: 2 |
| A | BoxIn | Print | HttpSend | | A2 | 12 | A: 3 |
| A | BoxIn | HttpSend | MailSend | | A3 | 6 | A: 4 |
| A | BoxIn | Print | | | A4 | 48 | A: 1 |
| A | Print | BoxIn | | | A5 | 5 | A: 5 |
| B | Print | | | | B1 | 12 | B: 2 |
| B | MailSend | Print | | | B2 (≒ B3) | 8 (B2 + B3 = 15) | B: 1 |
| B | Print | MailSend | | | B3 | 7 | - |

IMAGE PROCESSING APPARATUS AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2018-041265 filed Mar. 7, 2018.

BACKGROUND

(i) Technical Field

The present invention relates to an image processing apparatus and a non-transitory computer readable medium storing an image processing program.

(ii) Related Art

In the related art, a technique has been proposed in which a processing request (job) frequently input by a user to an image processing apparatus is stored as a processing request template (job template). By using the stored processing request template, the user is able to easily input jobs.

For example, JP2008-210383A discloses a Multi Function Printer (MFP) having a function of accumulating and storing an operation history including a type of a job or an execution parameter of a job for each user and automatically generating a job template for each user based on the operation history.

SUMMARY

However, there are cases where a user frequently inputs a processing request flow (job flow) including plural (a series of) processing requests to an image processing apparatus. In this case, it is necessary to store the processing request flow as a processing request template.

For example, in a case where a time interval at which plural consecutive jobs are input is equal to or less than a threshold value, it is conceivable to recognize the plural jobs as a job flow and to use the job flow as a processing request template. However, in this case, plural jobs whose input time intervals are apart but originally involved may not be regarded as a job flow, or in a case where the input time interval is short, plural jobs which are not originally involved may be regarded as a job flow.

Aspects of non-limiting embodiments of the present disclosure relate to an image processing apparatus which accurately generates a processing request template including plural processing requests, as compared with a case where processing requests are associated using a time interval, and a non-transitory computer readable medium storing an image processing program.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an image processing apparatus including a processing request template generation unit that generates a processing request flow in which a plurality of processing requests are associated with each other, as one processing request template, in a case where there is a commonality among a plurality of pieces of image data relating to the plurality of processing requests each of which request type is identified; and a template display control unit that displays the processing request template on a display unit.

BRIEF DESCRIPTION OF THE DRAWINGS

Exemplary embodiment(s) of the present invention will be described in detail based on the following figures, wherein:

FIG. 3 is a conceptual diagram showing an example of contents of a job flow DB.

DETAILED DESCRIPTION

Hereinafter, exemplary embodiments of the present invention will be described.

Figure 1:
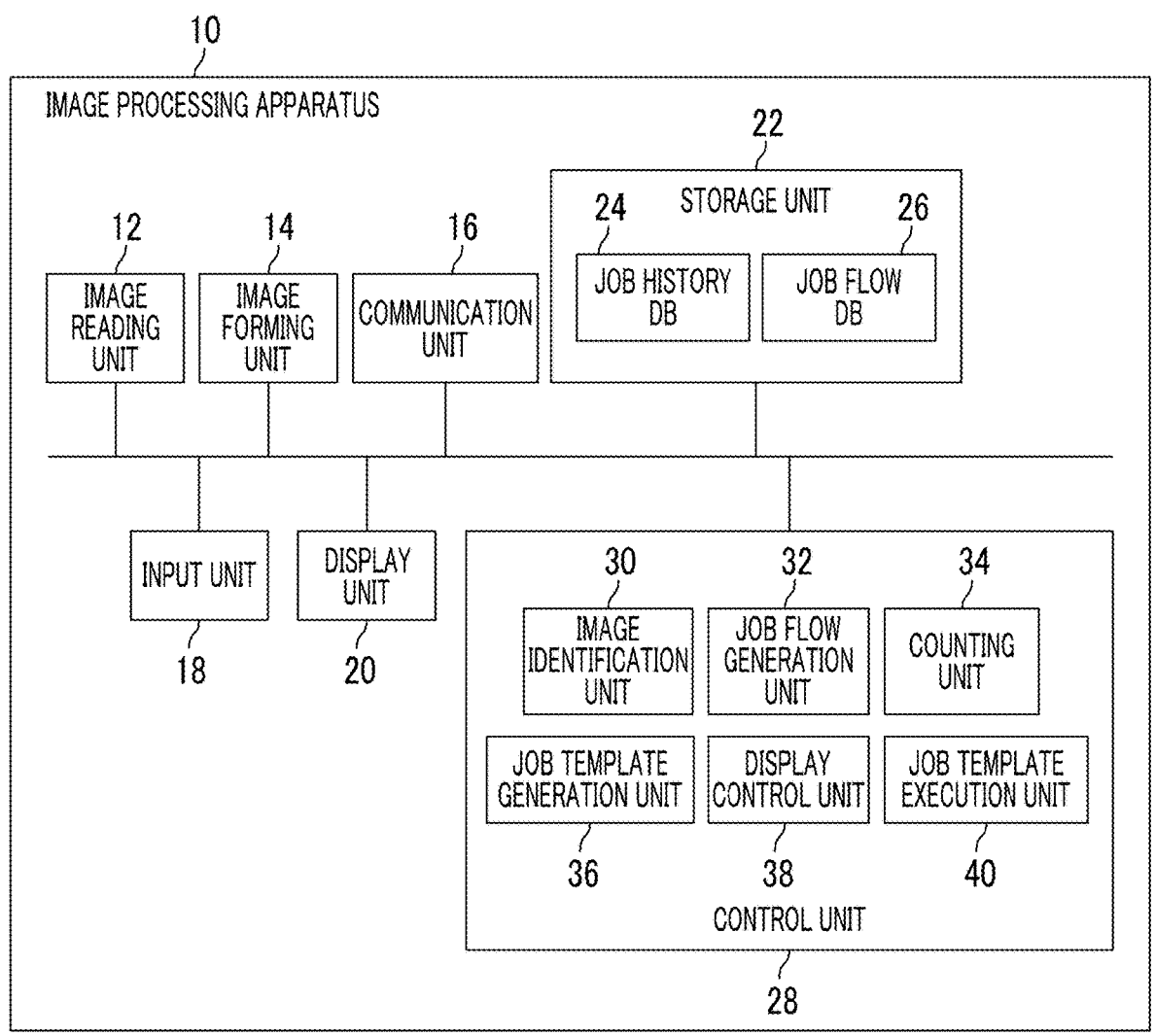
FIG. 1 is a schematic configuration diagram of an image processing apparatus according to the present exemplary embodiment.

FIG. 1 is a schematic configuration diagram of an image processing apparatus 10 according to the present exemplary embodiment. In the present exemplary embodiment, the image processing apparatus 10 is an MFP having a scan function, a print function, a copy function, a facsimile function, a mail sending function, a transfer function to a cloud server, and the like. The image processing apparatus 10 receives a processing request (job) from the user and executes a process corresponding to the job.

An image reading unit 12 includes a charge-coupled device (CCD) image sensor and the like. The image reading unit 12 performs a reading process for reading an image on a document such as paper set on a document table (not shown) of the image processing apparatus 10 to acquire image data.

An image forming unit 14 includes a processing unit that performs a printing process for reproducing image data to be a job target on a printing medium such as paper.

A communication unit 16 is configured with a network adapter or the like. The communication unit 16 is a so-called communication interface and is used to transmit and receive data to and from other devices through a communication line such as a LAN or the Internet. With the communication unit 16, the image processing apparatus 10 is capable of receiving a job from other devices (for example, a user terminal used by a user). Further, with the communication unit 16, it is possible to transmit image data to be a job target to another device (for example, a server or a FAX receiver).

An input unit 18 includes a touch panel, a button, or the like. The input unit 18 is provided for a user to input a command to the image processing apparatus 10.

The display unit 20 is configured with, for example, a liquid crystal panel or the like. Various types of information presented to various operation screens of the image processing apparatus 10 or the user are displayed on the display unit 20.

The storage unit 22 is configured to include a hard disk, a ROM, a RAM, and the like. The storage unit 22 stores an image processing program for operating each unit of the image processing apparatus 10. As shown in FIG. 1, a job history database (DB) 24 and a job flow DB 26 are stored in the storage unit 22.

The job history DB 24 is a database in which the history of a job input to the image processing apparatus 10 in the past is recorded. Every time a job is input to the image processing apparatus 10, the history of the job is accumulated in the job history DB 24. The history of a job includes the job type (request type) of the input job, the user information indicating the user who inputs the job, and the information on the image data that is the job target. In the job history DB 24, these pieces of information are recorded in association with each other.

The job type is information indicating the contents of the process that the user instructs by the job. Examples of the job type include BoxIn which is a job for storing image data in a confidential box (a folder defined in the storage unit 22 of the image processing apparatus 10), Print which is a job for printing image data, MailSend which is a job for sending image data in an e-mail format, HttpSend which is a job for transferring image data to a cloud server, Scan which is a job for reading a paper document to acquire image data, Copy which is a job for printing the image data acquired by reading a paper document, Fax which is a job for faxing image data, and the like.

The user information may be, for example, a user ID uniquely identifying the user. In a case where the user logs in (authentication) the image processing apparatus 10 before inputting a job to the image processing apparatus 10, the image processing apparatus 10 may specify the user who inputs the job based on the login information.

Examples of the information on the image data that is the job target includes a data capacity (file size) of image data, a checksum, a data name (file name), and the like. Alternatively, in the job history DB 24, the image data itself that is the job target may be recorded.

Preferably, for example, in the job history DB 24, the job attributes of the job related to the job input in the past are recorded in association with each other. The job attribute is information indicating the setting related to a job. For example, in a case where the job type is Print, the number of print sheets, N-UP setting, color mode setting, paper size setting, and the like are included.

The job flow DB 26 is a database in which data on the job flow generated by the job flow generation unit 32 described later is recorded. The details of the job flow DB 26 will be described later.

The control unit 28 is configured with a CPU, a microcontroller, or the like. The control unit 28 controls the operation of each unit of the image processing apparatus 10 according to the image processing program stored in the storage unit 22. As shown in FIG. 1, the control unit 28 also functions as an image identification unit 30, a job flow generation unit 32, a counting unit 34, a job template generation unit 36 as a processing request template generation unit, a display control unit 38 as a template display control unit, and a job template execution unit 40 as a processing request template execution unit. Hereinafter, the process of generating a job template in the image processing apparatus 10 will be described together with details of these functions exercised by the control unit 28.

The image identification unit 30 determines whether or not there is a commonality among plural pieces of image data related to plural jobs which are recorded in the job history DB 24 and input by the same user. It is possible to determine whether or not there is a commonality among plural pieces of image data by various methods.

For example, it is possible to determine the commonality among plural pieces of image data, based on at least one of a data capacity, a checksum, or a data name of image data. More specifically, in a case where the difference in data capacities of plural image data is within a threshold value, the checksums are the same, or the data names are the same or similar, it possible to determine that there is a commonality in the plural image data.

Alternatively, in a case where the image data itself as the job target is recorded in the job history DB 24, the commonality in the plural image data may be determined by performing image analysis on the image data. For example, pixel values of pixels corresponding to plural image data are compared with each other, and it may be determined that there is a commonality among the plural image data in a case where the similarity of the plural image data is equal to or more than the threshold value.

The job flow generation unit 32 associates plural jobs related to plural image data determined to have a commonality by the image identification unit 30 with the identified job types and generates a job flow as a processing request flow. That is, the job flow includes plural jobs input by the same user. Preferably, for example, the job flow also includes order information indicating the order of the plural jobs.

Figure 2:
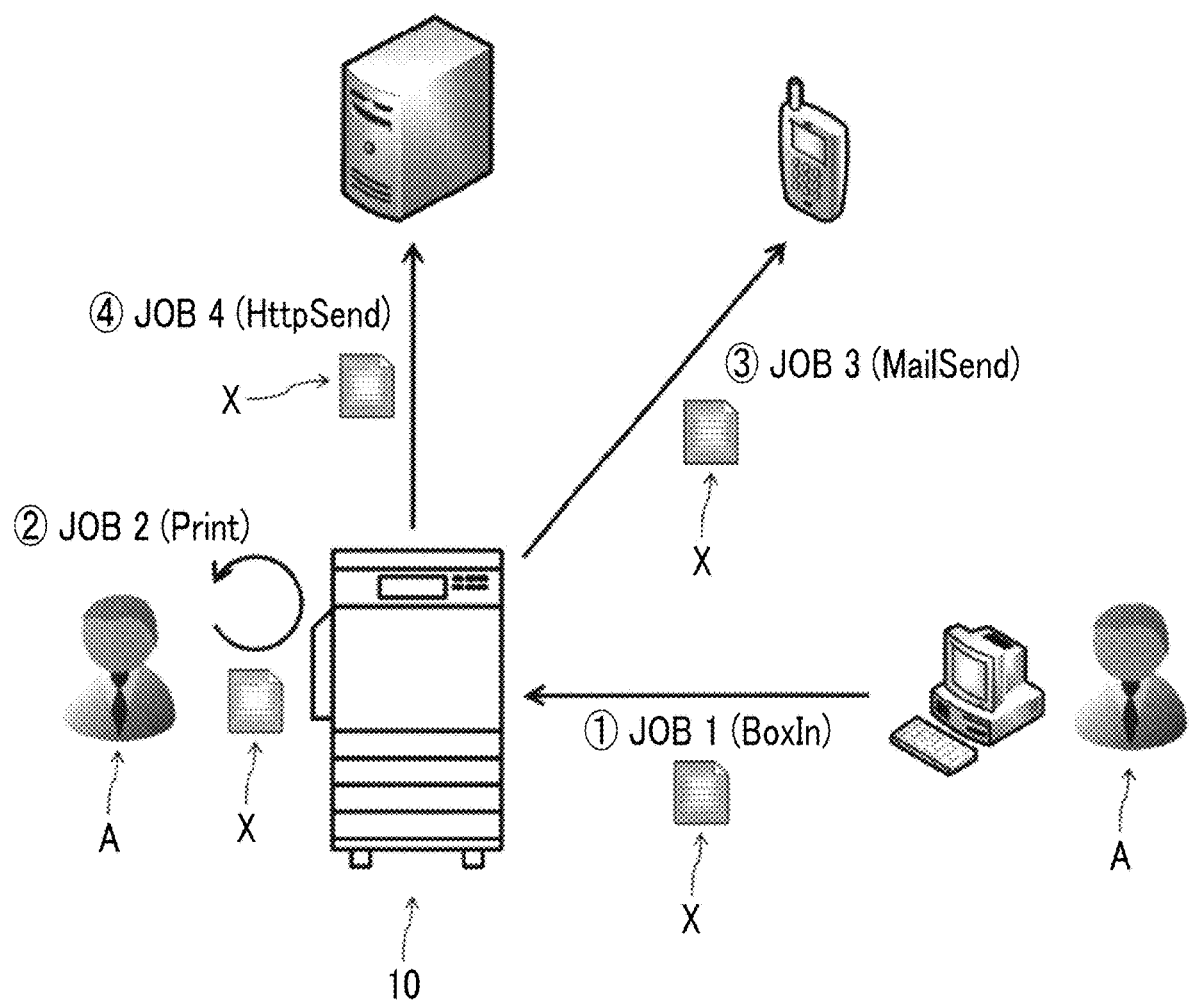
FIG. 2 is a conceptual diagram showing an example of a job flow.

For example, as shown in FIG. 2, a case is considered where the user A inputs plural jobs to the image processing apparatus 10 in the order of jobs 1 to 4, including a job 1 (job type is BoxIn) for storing the image data X in the confidential box of the image processing apparatus 10, a job 2 (job type is Print) for printing the image data X, a job 3 (job type is MailSend) for sending image data X in a mail format, and a job 4 (job type is HttpSend) for transferring image data X to the cloud server.

In this case, since the image identification unit 30 determines that there is a commonality in the image data relating to the jobs 1 to 4, the job flow generation unit 32 associates the jobs 1 to 4 with each other, and generates a job flow including order information indicating the order of the job 1, the job 2, the job 3, and the job 4.

The job flow generated by the job flow generation unit 32 is recorded in the job flow DB 26.

FIG. 3 shows the contents of the job flow DB 26. In FIG. 3, the job flow DB 26 is shown in a table format, and each record corresponds to each job flow. As shown in FIG. 3, in the job flow DB 26 according to the present exemplary embodiment, information on the job flow (such as user ID or number of executions) is associated with the job flow. The job flows of jobs 1 to 4 shown in FIG. 2 are stored as a job flow A1 in the job flow DB 26 shown in FIG. 3.

In a case where plural jobs related to the same image data input by the user has already been recorded as a job flow in the job flow DB 26, the job flow generation unit 32 does not newly register the plural jobs with the job flow DB 26. In this case, the number of executions of the recorded job flow is incremented by the counting unit 34 to be described later.

Preferably, for example, the job flow generation unit 32 records the job flows while distinguishing between users. In this case, as shown in FIG. 3, in the job flow DB 26, a user ID indicating the user who executes the job flow is associated with each job flow.

Further, in a case where a job attribute is recorded in the job history DB 24, it is preferable that the job flow generation unit 32 generates, for example, a job flow including the job attribute of each job. For example, with respect to the job flow shown in FIG. 2, it is preferable that the job flow (job flow A1 in FIG. 3) recorded in the job flow DB 26 includes, for example, the job attributes of the job 1, the job attributes of the job 2, the job attributes of the job 3, and the job attributes of the job 4. In this case, even in a case where plural jobs included in the two job flows are the same, in a case where any one of the job attributes of the plural jobs is different, the job flow generation unit 32 and records the two job flows in the job flow DB 26 while distinguishing between them.

The counting unit 34 counts the number of times each job flow recorded in the job flow DB 26 is executed. For example, in a case where the user A inputs a series of jobs BoxIn, Print, MailSend, and HttpSend, the counting unit 34 increments the number of executions of the job flow A1 by one. As shown in FIG. 3, the number of executions counted by the counting unit 34 is recorded in the job flow DB 26 in association with the job flow.

The job template generation unit 36 generates the job flow recorded in the job flow DB 26 as one job template. The job template is information including plural jobs included in the job flow. Preferably, for example, the job template includes information indicating the execution order of plural jobs included in the job flow. Further, in a case where the job flow includes the job attribute of each job, the job template may be information including the job attribute of each job. The generated job template is stored in the storage unit 22.

Preferably, for example, the job template generation unit 36 generates job templates while distinguishing between users. For example, in a case where the contents of the job flow DB 26 are the contents shown in FIG. 3, since the job flows (A1 to A4) on the user A and the job flows (B1 to B3) on the user B are recorded, the job template generation unit 36 generates at least one of the job flows A1 to A4 as a job template relating to the user A and generates at least one of the job flows B1 to B3 as a job template relating to the user B. The number of job templates that may be generated for one user may be preset.

Preferably, for example, the job template generation unit 36 selects a job flow to be generated as a job template, based on the number of executions of the job flow counted by the counting unit 34, from the plural job flows recorded in the job flow DB 26. Specifically, the job template generation unit 36 preferentially generates a job flow with a large number of executions among plural job flows recorded in the job flow DB 26 as a job template. In particular, in a case where a job template is generated for each user, a job flow with a large number of executions is preferentially generated as a job template, for each user.

For example, in a case where the contents of the job flow DB 26 are the contents shown in FIG. 3 and each user is set to be capable of generating two job templates, the job template generation unit 36 generates job flows A1 and A4 with two highest numbers of executions, among job flows A1 to A4 for the user A, as the job template of the user A. In addition, the job template generation unit 36 generates job flows B1 and B2 with two highest numbers of executions, among the job flows B1 to B3 for the user B, as the job template of the user B.

Of course, in a case where a job template is not generated for each user, among plural job flows for all users recorded in the job flow DB 26, job flows with a large number of executions are preferentially generated as a job template common to all users.

As described above, the job flow includes order information indicating the order of plural jobs, but the order of the plural jobs may not be important in some cases. For example, both MailSend which is a job for sending image data in a mail format and Print which is a job for printing image data may be performed first. Therefore, the job template generation unit 36 may regard plural job flows which include plural similar jobs and have different orders of the plural jobs, as the same job flow, and determine a job flow to be generated as a job template, based on the sum of the numbers of executions of the plural job flows.

For example, in the example of FIG. 3, the job flow B2 is a job flow in the order of MailSend and Print, and the job flow B3 is a job flow in the order of Print and MailSend. That is, the job flow B2 and the job flow B3 are configured with plural similar jobs, and they are two job flows having different order of the plural jobs. Therefore, the job template generation unit 36 regards the job flow B2 and the job flow B3 as the same job flow, adds eight which is the number of executions of the job flow B2 to seven which is the number of executions of the job flow B3, and regards the number of executions of the job flow B2 (or the job flow B3) as fifteen. Then, since the number of executions of the job flow B2 is larger than that of the job flow B1, the job template generation unit 36 gives priority to the job flow B2 over the job flow B1 and generates the job flow B2 as a job template.

On the other hand, the order of execution may be important between specific jobs. For example, it is a case where BoxIn which is a job for storing image data in a confidential box is executed and thereafter Print which is a job for printing image data stored in the confidential box is executed. In this case, it is necessary to store the image data to be printed in the confidential box prior to the Print job. Therefore, based on a premise that plural job flows which include plural similar jobs and have different orders of the plural jobs are regarded as the same job flow, the job template generation unit 36 preferably considers, for example, plural job flows having different orders of specific plural jobs of which orders are determined in advance, as separate job flows.

For example, in the example of FIG. 3, the job flow A4 is a job flow in the order of BoxIn and Print, and the job flow A5 is a job flow in the order of Print and BoxIn. Here, in cases of BoxIn and Print each of which order is determined in advance as a specific order, the job flow A4 and the job flow A5 are configured with plural similar jobs and are plural job flows having different orders of the plural jobs, but the job template generation unit 36 regards the job flow A4 and the job flow A5 as separate job flows.

Consider plural job flows which include plural similar jobs and have different job attributes of the respective jobs. For example, two job flows including two jobs, that is, BoxIn and Print, the job attribute of the Print job of one job flow is "two-sided printing", and the job attribute of the Print job of the other job flow is "single-sided printing". In this case, the job template generation unit 36 may regard the two job flows as separate job flows or may regard them as the same job flow. Which is to be done may be settable by the user or the like.

In the case where the two job flows are regarded as the same job flow and the two job flows are used as the job template, the job attribute in the job template may be one of the job attributes of the jobs included in the two job flows. For example, in the above example, the job attribute of the Print job in the job template including two jobs BoxIn and Print includes "two-sided printing" or "single-sided printing". Which job attribute is applied may be settable by the user. Alternatively, a job attribute of a job with a larger number of executions may be applied.

The display control unit 38 displays the job template generated by the job template generation unit 36 on the display unit 20. Displaying a job template means to display a button for executing a job template or a button for storing a job template in the storage unit 22, or to display a job template in order to recognize information (such as a text or an icon) indicating the contents of the job template. In addition, the display control unit 38 may display the job template on a display unit other than the display unit 20 of the image processing apparatus 10. For example, in a case where it is possible to input a job from the user terminal through the network to the image processing apparatus 10, the display control unit 38 may display the job template on the display unit of the user terminal.

The timing at which the display control unit 38 displays the job template may be the timing at which the user inputs a command to display a screen for selecting a job template or the timing at which the user logs in to the image processing apparatus 10.

Preferably, for example, in a case where a new job (new processing request) is input from the user, the display control unit 38 may display a job template in which a job of the same job type as that of the new job is located at the head. For example, it is assumed that job flows B1 to B3 (see FIG. 3) are generated as a job template for the user B, and the user B inputs a MailSend job as a new job. In this case, the display control unit 38 displays on the display unit 20, the job template of the job flow B2 having the MailSend job, input by the user B, at the head. This makes it possible to display a job template having a high probability of being executed by the user. In a case where there are plural job templates having the same job type as that of the new job at the head, the plural job templates may be displayed.

In a case where a new job is input from the user, the display control unit 38 preferentially displays a job template in which the same job type as that of the new job is located at the head and which is the job template of the job flow with a large number of executions. For example, it is assumed that job flows A1 to A5 (see FIG. 3) are generated as job templates for user A, and user A inputs a BoxIn job as a new job. In this case, the display control unit 38 preferentially displays the job template of the job flow A4 having the largest number of executions, among the job flows A1 to A4 having the BoxIn job input by the user A at the head, on the display unit 20. This makes it possible to preferentially display a job template having a higher probability of being executed by the user. In a case where there are plural job templates having the same job type as the new job at the head, a predetermined number of job templates with high number of executions may be displayed. For example, in the above example, in a case of displaying two job templates, among job flows A1 to A4 having a BoxIn job input by the user A at the head, two job templates of job flows A4 and A1, in which the number of executions is the highest and the second highest, are displayed.

In addition, in a case where the generated job template is selected by the user and executed by the job template execution unit 40 to be described later, the display control unit 38 may preferentially display the previously executed job template, among the plural job templates. For example, in a case where the user A executes the job template of the job flow A1, the execution history of the job template of the user A is recorded in the storage unit 22. Thereafter, in a case where the user A again inputs a job to the image processing apparatus 10, the display control unit 38 specifies the job template of the job flow, which is the job template previously executed by the user A, based on the execution history of the job template of the user A recorded in the storage unit 22, and preferentially displays the job template. This makes it possible for the user to easily select the previously executed job template.

In a case where the job template displayed on the display unit 20 is selected by the user, the job template execution unit 40 executes the selected job template. As described above, since the job template in the present exemplary embodiment includes plural jobs, executing a job template means sequentially executing the plural jobs included in the job template.

By the job template execution unit 40 executing the job template, the user is able to execute plural jobs without having to input plural jobs one by one. In addition, in a case where a job attribute is included in the job template, the user is able to execute plural jobs without having to set the job attribute of each job one by one.

The schematic configuration of the image processing apparatus 10 according to the present exemplary embodiment is as described above. According to the present exemplary embodiment, plural jobs related to image data having a commonality, which is input by the same user, are grouped as a job flow, and the job flow is generated as a job template. In other words, a job template including the plural jobs is generated after the relevance between the plural jobs is confirmed.

Although the exemplary embodiment according to the present invention has been described above, the present invention is not limited to the above exemplary embodiment, and various modifications are possible without departing from the gist of the present invention.

For example, in the above-described exemplary embodiment, the image processing apparatus 10 is an MFP, but as the image processing apparatus according to the exemplary embodiment of the invention, a computer such as a server having functions of the storage unit 22 and the control unit 28 of the image processing apparatus 10 may be used. In this case, the job history of the MFP is transmitted to the server, and the server performs a job template generation process, based on the received job history. Then, the server causes the generated job template to be displayed on the display unit of the user terminal or the MFP, and transfers the job template selected by the user to the MFP, thereby causing the MFP to execute the job template.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor, configured to:
generate a processing request flow in which a plurality of processing requests are associated with each other, as one processing request template, in a case where there is a commonality among a plurality of pieces of image data relating to the plurality of processing requests each of which request type is identified; and
display the processing request template on a display,
wherein the processor preferentially sets the processing request flow with a large number of executions, among a plurality of the processing request flows, as the processing request template,
wherein the processor regards the plurality of processing request flows including a plurality of similar processing requests and having different orders of the plurality of processing requests, as a same processing request flow.

2. The image processing apparatus according to claim 1, wherein the processor generates the processing request templates while distinguishing between users.

3. The image processing apparatus according to claim 1, wherein the processor regards the plurality of processing request flows including a plurality of similar processing requests and having different orders of a specific plurality of processing requests predetermined in advance, as separate processing request flows.

4. The image processing apparatus according to claim 2, wherein the processor regards the plurality of processing request flows including a plurality of similar processing requests and having different orders of a specific plurality of processing requests predetermined in advance, as separate processing request flows.

5. The image processing apparatus according to claim 1, wherein in a case where a new processing request is input, the processor displays the processing request template in which the processing request of the same request type as the type of the new processing request is located at the head.

6. The image processing apparatus according to claim 5, wherein in a case where a new processing request is input, the processor preferentially displays the processing request template of the processing request flow with a large number of executions, among the plurality of processing request templates in which the processing request of the same request type as the type of the new processing request is located at the head.

7. The image processing apparatus according to claim 1, wherein the processor preferentially displays the processing request template which is previously executed, among the plurality of processing request templates.

8. A non-transitory computer readable medium storing an image processing program, causing a computer to function as:
a processing request template generation unit that generates a processing request flow in which a plurality of processing requests are associated with each other, as one processing request template, in a case where there is a commonality among a plurality of pieces of image data relating to the plurality of processing requests each of which request type is identified; and
a template display control unit that displays the processing request template on a display unit,
wherein the processing request template generation unit preferentially sets the processing request flow with a large number of executions, among a plurality of the processing request flows, as the processing request template,
wherein the processing request template generation unit regards the plurality of processing request flows including a plurality of similar processing requests and having different orders of the plurality of processing requests, as a same processing request flow.

9. An image processing apparatus comprising:
processing request template generation means for generating a processing request flow in which a plurality of processing requests are associated with each other, as one processing request template, in a case where there is a commonality among a plurality of pieces of image data relating to the plurality of processing requests each of which request type is identified; and
template display control means for displaying the processing request template on a display unit,
wherein the processing request template generation means preferentially sets the processing request flow with a large number of executions, among a plurality of the processing request flows, as the processing request template,
wherein the processing request template generation means regards the plurality of processing request flows including a plurality of similar processing requests and having different orders of the plurality of processing requests, as a same processing request flow.

* * * * *